US010276280B1

(12) United States Patent
Lewis, Sr.

(10) Patent No.: US 10,276,280 B1
(45) Date of Patent: Apr. 30, 2019

(54) POWER OVER ETHERNET TWISTED PAIR COMMUNICATIONS CABLES WITH A SHIELD USED AS A RETURN CONDUCTOR

(71) Applicant: Superior Essex International LP, Atlanta, GA (US)

(72) Inventor: Timothy J. Lewis, Sr., Great Bend, KS (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 15/933,873

(22) Filed: Mar. 23, 2018

(51) Int. Cl.
| H01B 11/04 | (2006.01) |
| H01B 9/02 | (2006.01) |
| H01B 9/00 | (2006.01) |
| H01B 11/10 | (2006.01) |

(52) U.S. Cl.
CPC ............... *H01B 9/02* (2013.01); *H01B 9/003* (2013.01); *H01B 11/10* (2013.01); *H01B 11/04* (2013.01)

(58) Field of Classification Search
CPC ................................ H01B 11/04; H01B 11/06
USPC ...................................................... 174/113 R
See application file for complete search history.

(56) References Cited

U.S. PATENT DOCUMENTS

| 3,160,702 A | 12/1964 | Lapsley |
| 3,594,492 A | 7/1971 | Bahder |
| 4,408,443 A | 10/1983 | Brown |
| 4,639,544 A | 1/1987 | Dableh |
| 5,077,449 A * | 12/1991 | Cornibert ............. B29C 47/027 156/244.12 |
| 5,399,813 A | 3/1995 | McNeill |
| 5,424,491 A | 6/1995 | Walling |
| 5,514,837 A | 5/1996 | Kenny |
| 5,770,820 A | 6/1998 | Nelson |
| 5,902,962 A | 5/1999 | Gazdzinski |
| 6,153,826 A | 11/2000 | Kenny |
| 6,304,089 B1 | 10/2001 | Paulson |
| 7,241,951 B2 | 7/2007 | Danazzi |
| 8,669,474 B2 | 3/2014 | Battle |
| 9,805,844 B2 * | 10/2017 | Bopp ..................... H01B 11/08 |
| 9,842,672 B2 | 12/2017 | Jiang et al. |
| 2003/0168242 A1 | 9/2003 | Whidden |
| 2005/0173149 A1 | 8/2005 | Gouge |
| 2006/0137894 A1 | 6/2006 | Cusson |
| 2007/0102188 A1 | 5/2007 | Glew |

(Continued)

OTHER PUBLICATIONS

Office Action for U.S. Appl. No. 15/697,545, dated May 3, 2018.

(Continued)

*Primary Examiner* — Chau N Nguyen

(57) ABSTRACT

A communications cable suitable for Power over Ethernet applications may include a plurality of twisted pairs of individually insulated conductors extending in a longitudinal direction. At least one of the plurality of twisted pairs may have a first direct current resistance and may be configured to transmit a power signal. A shield that includes longitudinally continuous electrically conductive material may be formed around at least a portion of the plurality of twisted pairs, and the shield may have a second direct current resistance approximately equal to the first direct current resistance. As a result, the shield may function as a return path or conductor for the at least one twisted pair. A jacket may also formed around the plurality of twisted pairs and the shield.

20 Claims, 7 Drawing Sheets

(56) References Cited

U.S. PATENT DOCUMENTS

| | | | |
|---|---|---|---|
| 2010/0141282 A1* | 6/2010 | Heath | H04L 12/10 324/704 |
| 2014/0238720 A1 | 8/2014 | Kroishl | |
| 2014/0293994 A1* | 10/2014 | Pepe | G02B 6/4284 370/352 |
| 2015/0206629 A1 | 7/2015 | Ona | |
| 2017/0229214 A1 | 8/2017 | Mashio | |

OTHER PUBLICATIONS

General Cable, "GenSPEED Efficienc Max Category 6A 10 Gig Cable for High-Power PoE Applications, Featuring Mosaic Crossblock Technology Product Sheet", 2014

Notice of Allowance for U.S. Appl. No. 15/679,545, dated Oct. 15, 2018.

* cited by examiner

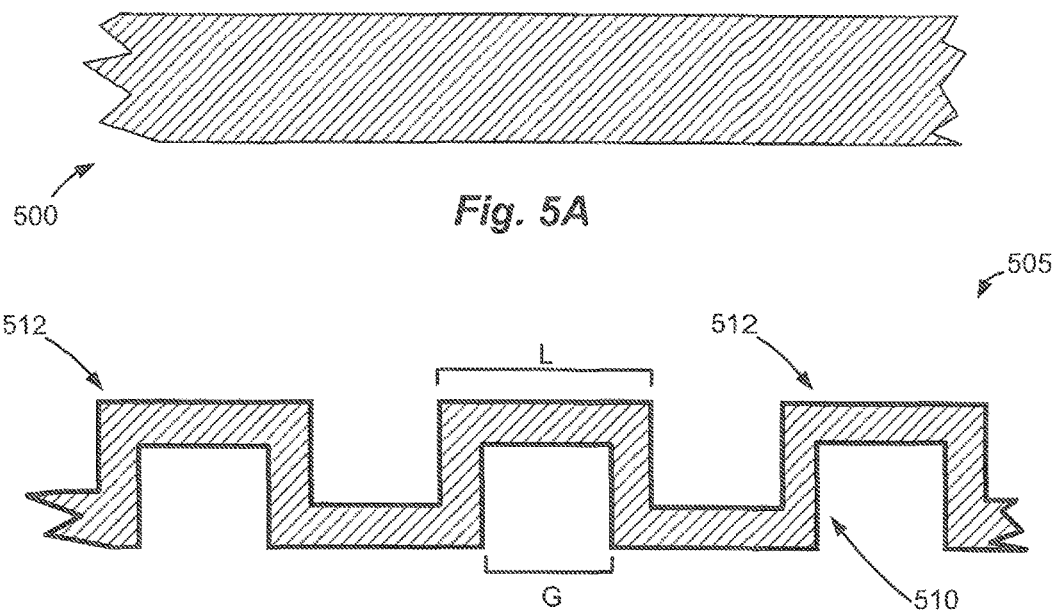
Fig. 5A
Fig. 5B
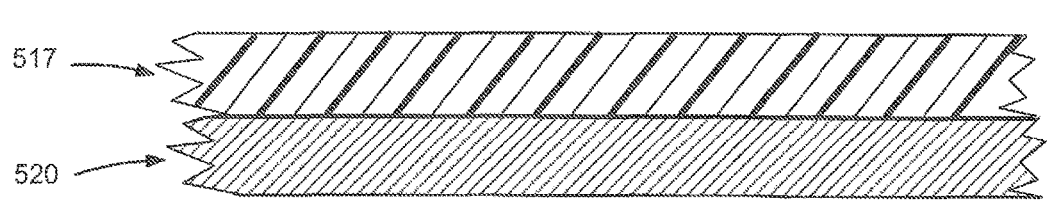
Fig. 5C
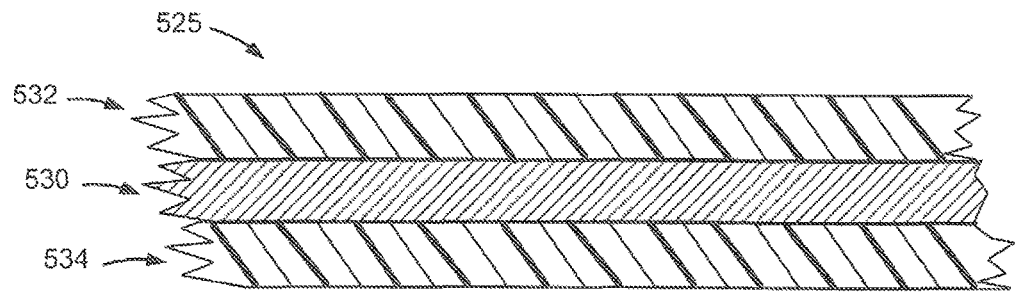
Fig. 5D

POWER OVER ETHERNET TWISTED PAIR COMMUNICATIONS CABLES WITH A SHIELD USED AS A RETURN CONDUCTOR

TECHNICAL FIELD

Embodiments of the disclosure relate generally to communications cables and, more particularly, to twisted pair communications cables suitable for use in Power over Ethernet applications.

BACKGROUND

A wide variety of different types of communications cables are utilized to transmit information. For example, twisted pair communications cables are utilized to transmit Ethernet and other data signals. In certain applications, twisted pair cables are utilized to provide both data signals and electrical power to a wide variety of devices, such as lighting devices, wireless access points, etc. Typically, electrical power is provided over twisted pairs in accordance with a Power over Ethernet ("PoE") standard. In conventional PoE cables, a portion of the twisted pair conductors are utilized to transmit a direct current ("DC") power signal and another portion of the twisted pair conductors are utilized to transmit a DC return signal. For example, a first twisted pair transmits a power signal while a second twisted pair serves as a return path. The use of separate twisted pair conductors for positive and negative paths limits the overall power transmission capabilities of a PoE cable. Accordingly, there is an opportunity for improved twisted pair communications cables suitable for PoE applications. In particular, there is an opportunity for improved twisted pair communications cables in which one or more shield layers are utilized as return paths in PoE applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 5A-5G are cross-sectional views of example shield constructions that may be utilized as return conductors in twisted pair Power over Ethernet cables, according to illustrative embodiments of the disclosure.

DETAILED DESCRIPTION

Figure 1:
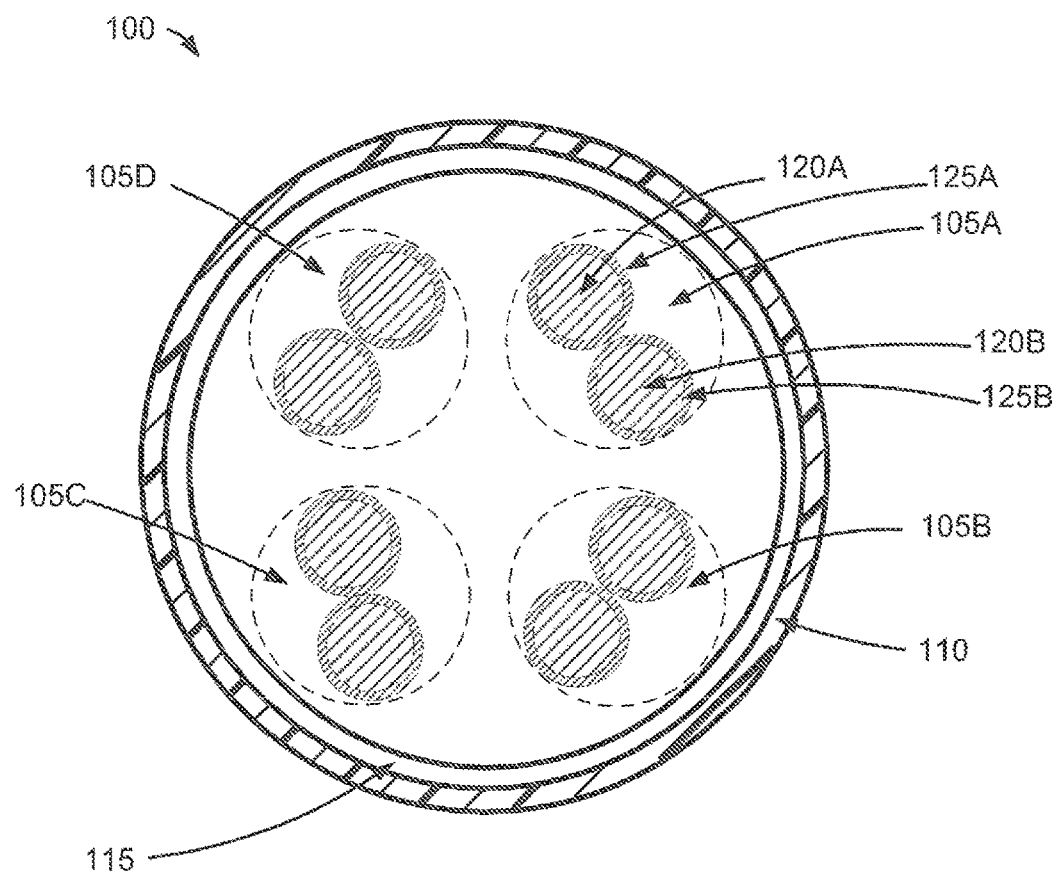
FIGS. 1-4 are cross-sectional views of example twisted pair cables suitable for use in Power over Ethernet applications, according to an illustrative embodiment of the disclosure.

Various embodiments of the present disclosure are directed to twisted pair cables suitable for use in Power over Ethernet ("PoE") applications. According to an aspect of the disclosure, a communications cable may include a plurality of longitudinally extending twisted pairs of individually insulated conductors, and at least one of the plurality of twisted pairs may be configured to transmit a power signal. The at least one twisted pair may have a first direct current ("DC") resistance. Additionally, a shield may be formed around at least a portion of the plurality of twisted pairs, and the shield may include longitudinally continuous electrically conductive material having a second DC resistance that is approximately equal to the first DC resistance. As a result of the approximately equal DC resistances, the shield may be utilized as a return conductor or return path for the power signal transmitted on the at least one twisted pair. A jacket may then be formed around the twisted pairs, the shield, and/or other cable components.

A wide variety of different shield configurations may be utilized as desired in various embodiments. In certain embodiments, a shield may be formed as an overall shield around a plurality of twisted pairs. The shield may be constructed such that its DC resistance is approximately equal to that of one, two, or any other suitable number of twisted pairs that are intended to transmit power. In other embodiments, one or more shields may be respectively formed around various subsets of a plurality of twisted pairs. For example, a shield may be formed around two twisted pairs within a four pair cable. As desired, multiple shields may be formed around different subsets of twisted pairs, and each shield may have a DC resistance that is approximately equal to an associated twisted pair or group of twisted pairs. In other embodiments, one or more individual shields may be provided, with each individual shield formed around a single twisted pair. As desired, an individual shield may have a DC resistance that is approximately equal to that of a twisted pair. In other embodiments, a plurality of shields may have a combined DC resistance that is approximately equal to that of one or more twisted pairs. In yet other embodiments, a plurality of different types of shields may be utilized. For example, a cable may include both one or more individual shields and an overall shield. The shield configurations discussed herein are provided by way of non-limiting example only.

Each shield may also be formed with a wide variety of suitable constructions. In other words, each shield may be formed from any number of suitable materials, with any number of suitable layers, and/or with a wide variety of suitable dimensions. According to an aspect of the disclosure, a shield may include longitudinally continuous electrically conductive material that may function as a return path for a transmitted power signal. In certain embodiments, a shield may be formed from a single layer of electrically conductive material, such as a metallic material (e.g., aluminum, copper, etc.). For example, a shield may be formed from a metallic foil. In other embodiments, a shield may include one or more layers of electrically conductive material in combination with one or more additional layers. For example, a layer of electrically conductive material (e.g., a metallic foil layer, etc.) may be formed on a dielectric layer or sandwiched between two dielectric layers. In yet other embodiments, a shield may include a braided shield layer, such as a braided shield layer in combination with one or more separate layers of electrically conductive material (e.g., one or more metallic foil layers, etc.). Indeed, any suitable types and numbers of layers may be utilized to form a shield.

Additionally, a shield and/or various layers of the shield may be sized in order to have a DC resistance that is approximately equal to that of one or more twisted pairs. A wide variety of suitable methods and/or techniques may be utilized in order to form a shield with a desired DC resistance. For example, a width and/or thickness of one or more electrically conductive layers may be selected in order to provide a desired DC resistance. As another example, a layer of electrically conductive material may be corrugated or otherwise manipulated in order to provide a desired DC resistance. The addition of corrugations may increase the DC resistance of an electrically conductive material, and any number of suitable corrugations may be utilized as desired. Corrugations may also be formed with any suitable size and/or distance between corrugations. As yet another example, multiple layers of a shield may be positioned in contact with one another, and a DC resistance of the shield may be based on the combined resistances of the contacting layers. For example, a metallic foil layer may be positioned in contact with a braided layer. Indeed, a wide variety of suitable shield dimensions and/or configurations may be provided in order to result in a shield with a desired DC resistance. Further, the DC resistance of a shield may be approximately equal to any desired number of twisted pairs.

As a result of utilizing one or more shields as return conductors, the power transmission capabilities of a twisted pair PoE cable may be enhanced relative to conventional PoE cables. In conventional cables, different pairs are utilized for positive and return signals. Accordingly, multiple pairs are required in order to transmit a power signal. However, by utilizing shield layers to transmit a return signal, a greater number of twisted pairs can be utilized to transmit power signals, thereby increasing the current and/or power capacity of the twisted pair cable. Further, in certain embodiments, the use of return path shields may permit a reduction in the conductor sizes of one or more twisted pairs. Although smaller conductors may be capable of transmitting less power than larger conductors, the use of return path shields allow a greater number of conductors to be utilized to transmit a similar power signal as larger conductors. Accordingly, the power transmission capabilities of a cable with smaller conductors may be similar to those of conventional PoE cables, thereby permitting the cable to be installed in smaller spaces.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1-4 illustrate cross-sectional views of a few example cables suitable for use in PoE applications. The cables of FIGS. 1-4 are illustrated as twisted pair communications cables; however, embodiments of the disclosure may additionally be applicable to composite or hybrid cables that include a combination of twisted pairs and other transmission media (e.g., optical fibers, etc.). Indeed, suitable cables may include any number of transmission media including but not limited to one or more twisted pairs, optical fibers, coaxial cables, and/or power conductors.

With reference to FIG. 1, a cross-section of a first example cable 100 is illustrated. The cable 100 may include a plurality of longitudinally extending twisted pairs 105A-D, and at least one of the plurality of twisted pairs 105A-D may be configured to transmit a power signal. The twisted pairs 105A-D may be positioned within a cable core defined by a jacket 110 formed around the twisted pairs 105A-D. Additionally, at least one shield 115 may be incorporated into the cable 100. Although a single shield 115 is illustrated in FIG. 1, a plurality of shields may be utilized in other embodiments. Additionally, one or more of the shields may be configured to be utilized as a return path for power signals transmitted on one or more of the plurality of twisted pairs 105A-D. According to an aspect of the disclosure, a DC resistance of a shield may be approximately equal to that of one or more twisted pairs associated with the shield. In other words, if a power signal is transmitted via one or more conductors, the DC resistance of the one or more conductors may be approximately equal to that of a shield that serves as a return path for the power signal.

As shown in FIG. 1, the cable 100 may include four twisted pairs 105A, 105B, 105C, 105D; however, any other suitable number of pairs may be utilized. Each twisted pair (referred to generally as twisted pair 105) may include two electrical conductors 120A, 120B, each covered with respective insulation 125A, 125B. The electrical conductors of a twisted pair 105 (generally referred to as electrical conductors 120) may be formed from any suitable electrically conductive material, such as copper, aluminum, silver, annealed copper, gold, a conductive alloy, etc. Additionally, the electrical conductors 120 may have any suitable diameter, gauge, and/or other dimensions. Further, each of the electrical conductors 120 may be formed as either a solid conductor or as a conductor that includes a plurality of conductive strands that are twisted together.

Each twisted pair 105 can carry data or some other form of information, for example in a range of about one to ten Giga bits per second ("Gbps") or other suitable data rates, whether higher or lower. In certain embodiments, each twisted pair 105 may support data transmission of about two and one-half Gbps (e.g. nominally two and one-half Gbps), with the cable 100 supporting about ten Gbps (e.g. nominally ten Gbps). In certain embodiments, each twisted pair 105 may support data transmission of up to about ten Gbps (e.g. nominally ten Gbps), with the cable 100 supporting about forty Gbps (e.g. nominally forty Gbps).

In certain embodiments, the electrical conductors 120 of one or more twisted pairs may be sized in order to transmit a desired power signal. For example, the electrical conductors 120 may be formed with a suitable diameter or cross-sectional area that facilitates the transmission of a suitable power signal on the conductors 120. For example, in certain embodiments, the electrical conductors 120 of certain twisted pairs (e.g., illustrated twisted pairs 105A-D, etc.) may be 22 AWG or larger conductors. In other words, electrical conductors 120 may have a diameter and/or cross-sectional area that is greater than or equal to required minimum dimensions for 22 AWG conductors. For example, electrical conductors 120 may have a diameter that is greater than or equal to approximately 0.0240 inches (0.6096 mm). Additionally, the electrical conductors 120 and/or certain twisted pairs may be capable of transmitting a desired power signal for PoE applications. For example, a desired number of twisted pairs (e.g., the illustrated four twisted pairs 105A-D, etc.) may be capable of transmitting approximately 100 Watts of power at approximately 1.0 ampere per pair over a distance of approximately 100 meters with at least approximately 88% efficiency at a temperature of approximately twenty degrees Celsius (20° C.). In certain embodiments, each example twisted pair 105 may be capable of transmitting a desired portion of the overall power. For example, each set of two twisted pairs (e.g., twisted pairs 105A-B and 105C-D, etc.) may be capable of transmitting approximately 50 Watts of power. The power transmitted by each set of twisted pairs may be equal to the current carried by each twisted pair multiplied by the voltage between the two twisted pairs. The current and/or voltage on/between each twisted pair may be adjusted as desired in order to attain a desired power signal. As one example, each conductor of a twisted pair 105 may carry an approximately 0.5 ampere signal. Thus, a combined signal of approximately 1.0 ampere may be transmitted on a twisted pair.

Other suitable conductor sizes may be utilized as desired in other embodiments in order to fulfill a wide variety of power transmission requirements. For example, in certain embodiments, one or more twisted pairs may be formed with diameters that are smaller than 22 AWG. Although conventional PoE cables are typically formed with conductors that are 22 AWG or larger, the use of one or more shields as a return path may permit smaller conductors to be utilized in certain embodiments of the disclosure. In various embodiments, electrical conductors 120 may have diameters that are greater than or equal to approximately 0.0200, 0.0210, 0.0220, 0.0225, 0.0230, 0.0240, 0.0245, 0.0250, 0.0252, 0.0253, 0.0255, 0.0257, 0.0259, 0.0260, 0.0265, or 0.0271 inches, or diameters incorporated in a range between any two of the above values.

The twisted pair insulation (generally referred to as insulation 125) may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotritfluoroethylene ("ECTFE"), etc.), one or more polyesters, polyvinyl chloride ("PVC"), one or more flame retardant olefins, a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each of the electrical conductors utilized in the twisted pairs 105A-D may be formed from similar materials. In other embodiments, at least two of the twisted pairs may utilize different insulation materials. In yet other embodiments, the two conductors that make up a twisted pair 105 may utilize different insulation materials. As desired, in certain embodiments, insulation may additionally include a wide variety of other materials (e.g., filler materials, materials compounded or mixed with a base insulation material, etc.), such as smoke suppressant materials, flame retardant materials, etc.

In various embodiments, twisted pair insulation 125 may be formed from one or multiple layers of insulation material. A layer of insulation may be formed as solid insulation, unfoamed insulation, foamed insulation, or other suitable insulation. As desired, a combination of different types of insulation may be utilized. For example, a formed insulation layer may be covered with a solid foam skin layer. As desired with foamed insulation, different foaming levels may be utilized for different twisted pairs in accordance with twist lay length to assist in balancing propagation delays between the twisted pairs. Additionally, the insulation 125 may be formed with any suitable thickness, inner diameter, outer diameter, and/or other dimensions.

Each of the twisted pairs 105A-D may also be formed with any suitable twist lay. In certain embodiments, a desired number of twisted pairs may be formed with different respective twist lays. For example, in the illustrated four pair cable, each of the twisted pairs 105A-D may have a different twist lay. The different twist lays may function to reduce crosstalk between the twisted pairs, and a wide variety of suitable twist lay configurations may be utilized. In certain embodiments, the respective twist lays for the twisted pairs 105A-D may be selected, calculated, or determined in order to result in a cable 100 that satisfies one or more standards and/or electrical requirements. For example, twist lays may be selected such that the cable 100 satisfies one or more electrical requirements of a Category 5, Category 5e, Category 6, Category 6A, or other suitable standard, such as any suitable part of the TIA 568 standard set forth by the Telecommunications Industry Association. As desired, the twist lays may be selected such that the cable 100 has a desired propagation delay skew, such as a delay skew of less than approximately forty-five nanoseconds (45 ns) per one hundred meters (100 m). For example, the twist lays of the desired twisted pairs may be selected such that the propagation delay skew between any two pairs is less than a threshold value (e.g., 45 ns per 100 m, etc.). As another example, the twist lays may be selected such that the cable 100 has a direct current resistance unbalance between pairs that satisfies a desired value, such as a DC resistance unbalance of less than approximately one hundred milliohms (100 mΩ) per one hundred meters (100 m). In other words, the twist lays of the desired twisted pairs may be selected such that the direct current resistance unbalance between any two pairs is less than a threshold value (e.g., approximately 100 mΩ per 100m). Twist lays may be selected in order to satisfy a wide variety of other electrical requirements as desired in various embodiments.

A wide variety of suitable twist lays may be utilized as desired. In certain embodiments, each of the twisted pairs 105A-D may have a twist lay included in a range between approximately 0.292 inches and approximately 0.504 inches. For example, each of the twisted pairs 105A-D may have a different twist lay with each respective twist lay being between approximately 0.292 inches and approximately 0.504 inches. In other embodiments, each of the twisted pairs 105A-D may have a different twist lay with each respective twist lay being between approximately 0.304 inches and approximately 0.487 inches. In yet other embodiments, each of the twisted pairs 105A-D may have a different twist lay with each respective twist lay being between approximately 0.308 inches and approximately 0.481 inches. Indeed, a wide variety of suitable ranges of twist lays may be utilized as desired. In various embodiments, a minimum value for a twist lay range may be approximately 0.292, 0.299, 0.304, 0.309, 0.315, or 0.325 inches. A maximum value for a twist lay range may be approximately, 0.458, 0.467, 0.481, 0.487, 0.494, or 0.504 inches. A suitable twist lay range may be formed using any combination of the minimum or maximum values listed above. Additionally, in certain embodiments, the differences between twist lays of twisted pairs 105 that are circumferentially adjacent one another (for example the twisted pair 105A and the twisted pair 105B) may be greater than the differences between twist lays of twisted pairs 105 that are diagonal from one another (for example the twisted pair 105A and the twisted pair 105C). As a result of having similar twist lays, the twisted pairs that are diagonally disposed can be more susceptible to crosstalk issues than the twisted pairs 105 that are circumferentially adjacent; however, the distance between the diagonally disposed pairs may limit the crosstalk. Thus, the different twist lays and arrangements of the pairs can help reduce crosstalk among the twisted pairs 105.

As desired, the plurality of twisted pairs 105A-D may be twisted together with an overall twist or bunch. Any suitable overall twist lay or bunch lay may be utilized, such as a bunch lay between approximately 1.9 inches and approximately 15.0 inches. For example, a bunch lay may be approximately 1.9, 2.0, 2.5, 3.0, 3.5, 3.75, 4.0, 4.25, 4.5, 4.75, 5.0, 5.5, 6.0, 7.0, 7.5, 8.0, 9.0, 10.0, 11.0, 12.0, or 15.0 inches, or any value included in a range between two of the previously listed values (e.g., a bunch lay between approximately 3.5 and approximately 4.5 inches, etc.), or any value included in a range bounded on either a minimum or maximum end by one of the above values (e.g., a bunch lay that is less than or equal to approximately 4.25 inches, etc.). Further, the example twist lays discussed above may be final twist lays for the twisted pairs 105A-D. In certain embodiments, one or more of the twisted pairs 105A-D may be formed with initial twist lays, and the initial twist lays may be modified to resultant or final twist lays during the overall twisting or bunching of the twisted pairs 105A-D. Overall twisting in the same direction as one or more of the twisted pairs 105A-D may result in tightening the initial twist lays of the one or more pairs 105A-D. Conversely, overall twisting in an opposite direction as one or more of the twisted pairs 105A-D may result in loosening the initial twist lays. A wide variety of suitable combinations of twist lays and/or twist directions may be utilized as desired in order to obtain twisted pairs with desired final or resultant twist lays.

As desired in certain embodiments, one or more suitable bindings or wraps may be wrapped or otherwise formed around the twisted pairs 105A-D once they are twisted together. Additionally, in certain embodiments, multiple grouping of twisted pairs may be incorporated into a cable. As desired, each grouping may be twisted, bundled, and/or bound together. Further, in certain embodiments, the multiple groupings may be twisted, bundled, or bound together.

Figure 2:
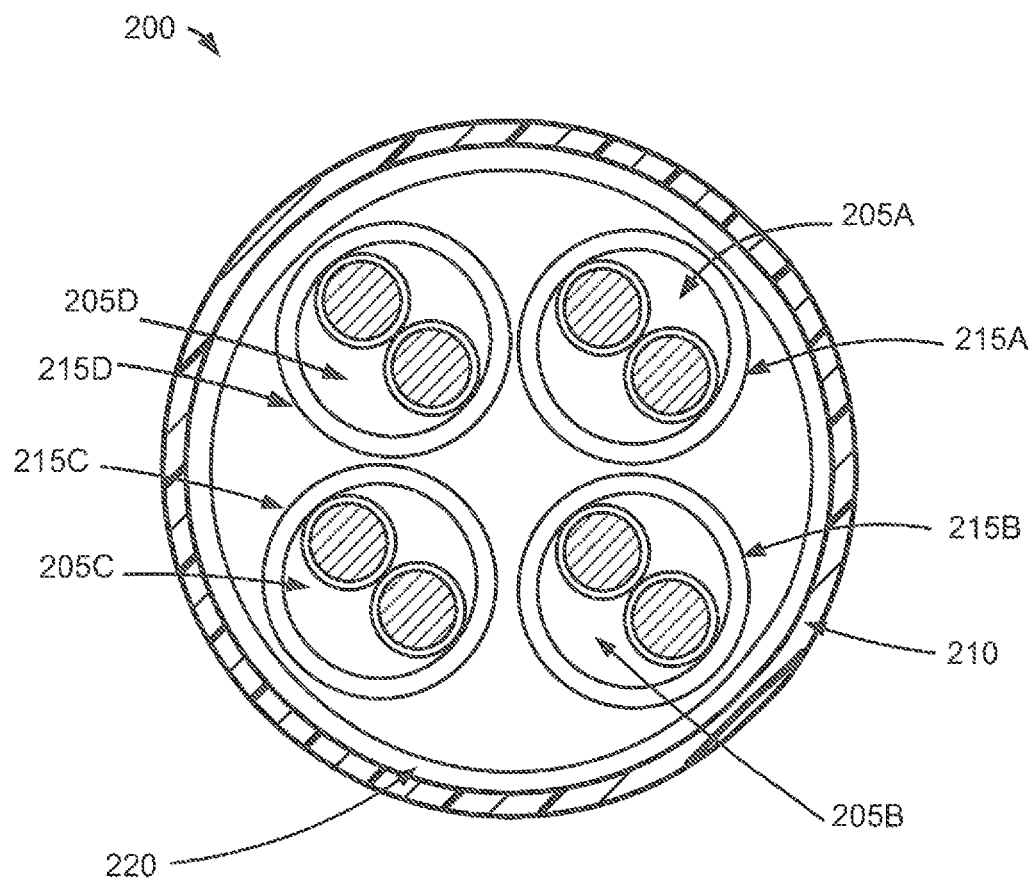
Figure 3:
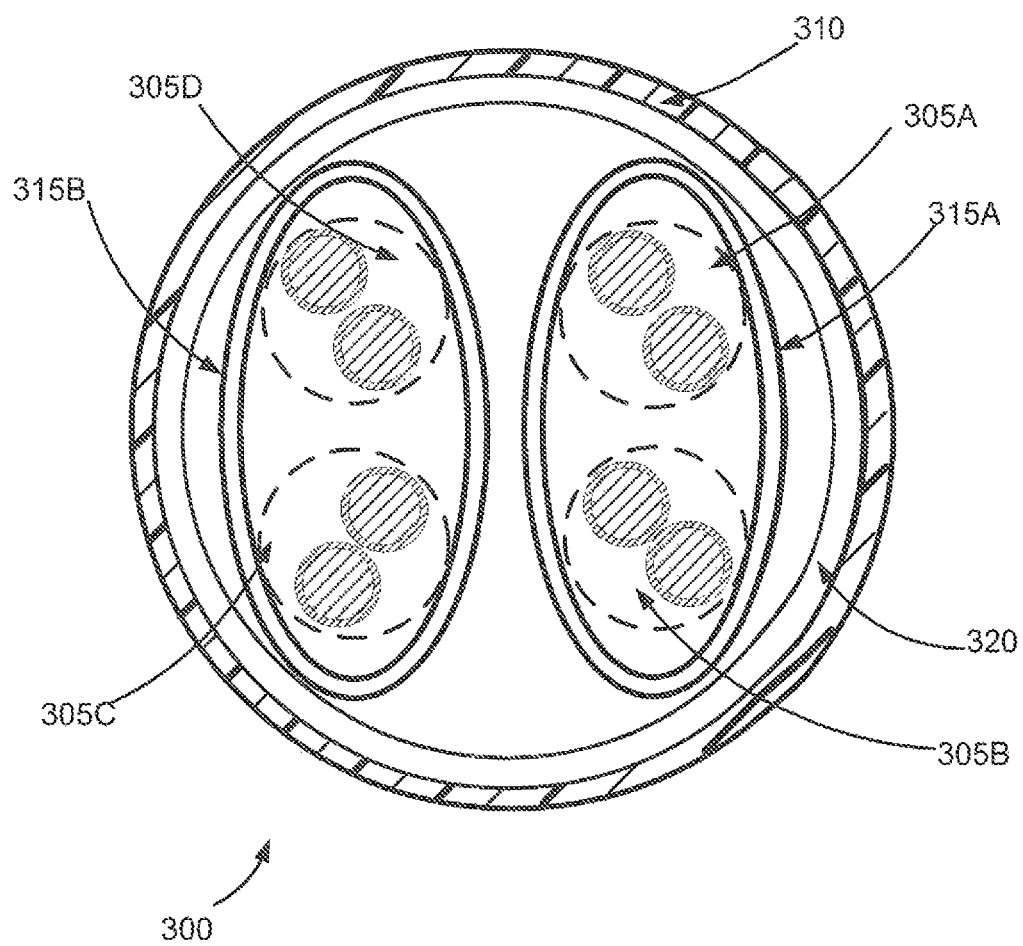

According to an aspect of the disclosure, one or more shields or shield elements may be incorporated into the cable 100. For example, as shown in FIG. 1, an overall shield 115 or shield layer may be formed around the plurality of twisted pairs 105A-D. In other embodiments, as shown in FIG. 2, individual shield layers may be respectively formed around each of the twisted pairs 105A-D. In yet other embodiments, as shown in FIG. 3, one or more shield layers may be formed around desired subgroups of the twisted pairs 105A-D. In other embodiments, a combination of various types of shields may be incorporated into a cable, such as individual shields and an overall shield. Further, in accordance with an aspect of the disclosure, at least one shield may include longitudinally continuous electrically conductive material configured to function as a return path or return conductor for PoE transmissions. Each shield (or combination of shields) utilized as a return conductor may have a DC resistance that is approximately equal to or balanced to that of one or more associated twisted pairs.

The external or overall shield 115 illustrated in FIG. 1 will now be described herein in greater detail; however, it will be appreciated that other shield layers may have similar constructions. For example, any of the shields discussed below with reference to FIGS. 2-4 may have similar constructions. Additionally, a few example shield constructions are discussed in greater detail below with reference to FIGS. 5A-5G. The shield constructions discussed with reference to FIGS. 5A-5G, as well as a wide variety of other shield constructions, may be applicable to any of the shields illustrated in FIGS. 1-4.

In certain embodiments, a shield 115 may be positioned within a cable core. In other embodiments, a shield (e.g., an overall shield 115, etc.) may be incorporated into the outer jacket 110. For example, the shield 115 may be sandwiched between two other layers of outer jacket material, such as two dielectric layers. As an alternative to incorporating a continuous shield into an outer jacket 110, electrically conductive material or other shielding material may be injected or inserted into the outer jacket 110 or, alternatively, the outer jacket 110 may be impregnated with shielding material. While this shielding material may not be suitable for use as a return path, it may provide electromagnetic shielding for the twisted pairs 105A-D. Indeed, a wide variety of suitable shielding arrangements may be utilized as desired in various embodiments. Additionally, in certain embodiments, a cable may include a separate, armor layer (e.g., a corrugated armor, etc.) for providing mechanical protection.

Each shield 115 may be formed with a wide variety of suitable constructions. In other words, each shield 115 may be formed from any number of suitable materials, with any number of suitable layers, and/or with a wide variety of suitable dimensions. In certain embodiments, as discussed in greater detail below with reference to FIG. 5A, a shield 115 may be formed from a single layer of electrically conductive material, such as a single layer of metallic material (e.g., aluminum, copper, etc.). For example, a shield 115 may be formed from a metallic foil. In other embodiments, a shield 115 may be formed from multiple layers of electrically conductive material. For example, a shield 115 may be formed from multiple foil layers. As another example, as described in greater detail below with reference to FIG. 5G, a shield 115 may include one or more metallic strips combined on a base metallic layer (e.g., a foil layer, etc.), and the metallic strips may increase the power transmission capabilities of the shield 115. In other embodiments, a shield 115 may include one or more layers of electrically conductive material in combination with one or more additional layers. For example, as described in greater detail below with reference to FIG. 5C, a layer of electrically conductive material (e.g., a metallic foil layer, etc.) may be formed on a dielectric layer. As another example, as described in greater detail below with reference to FIG. 5D, a layer of electrically conductive material may be sandwiched between two dielectric layers.

In the event that multiple shields are incorporated into a cable 100 (e.g., individual shields, multiple shields around groups of pairs, a combination of an overall shield with additional shields, etc.), the use of one or more dielectric layers may provide electrical isolation between the various shields. For example, a plurality of shields (e.g., individual shields, etc.) may be formed with an outer dielectric layer. In certain embodiments, an electrically conductive layer may be formed on a dielectric layer such that the electrically conductive layer faces the surrounded twisted pairs. In other embodiments, electrically conductive material may be sandwiched between two dielectric layers. Accordingly, a plurality of shields may be positioned adjacent to one another within a cable core, and the shields may be electrically isolated from one another. Any desired number of the plurality of shields may then be configured to function as a separate return path with a DC resistance balanced to one or more respective twisted pairs.

In other embodiments, a shield 115 may include a braided shield layer. In yet other embodiments, a shield 115 may include a braided shield layer in combination with one or more separate layers of electrically conductive material (e.g., one or more metallic foil layers, etc.). For example, as described in greater detail below with reference to FIG. 5E, a shield 115 may include a layer of electrically conductive material positioned adjacent to a braided layer. As a result, the entire shield 115 may be utilized as a return path, and the DC resistance of the shield 115 may be the combined DC resistance of the braided layer and the electrically conductive layer. As another example, as described in greater detail below with reference to FIG. 5F, a shield 115 may be formed with a dielectric layer positioned between a braided layer and an electrically conductive layer. As a result, the shield 115 may be configured such that a single layer (e.g., the electrically conductive layer, etc.) functions as a return path. A wide variety of other shield constructions may be utilized as desired in various embodiments. These constructions may include any suitable types and numbers of layers in any suitable combination.

A wide variety of suitable techniques and/or processes may be utilized to form a shield 115 and/or various layers of a shield 115. For example, a metallic material may be formed or provided as a foil that can be wrapped around one or more twisted pairs 105A-D. As another example, a plurality of layers of electrically conductive material (e.g., stacked layers of metallic foil, etc.) may be provided. As yet another example, electrically conductive material may be pressed, bent, cut, or otherwise mechanically shaped in order to form a layer that can be wrapped or curled around one or more twisted pairs 105A-D. As desired, electrically conductive material may be corrugated. In other embodiments, electrically conductive strands (e.g., metallic strands, etc.) may be combined either together or optionally with strands of other material in order to form a longitudinally continuous braided shield. In yet other embodiments, one or more electrically conductive layers (e.g., a metallic foil, etc.) may be combined with one or more base or dielectric layers. For example, a base material or dielectric material may be extruded, poltruded, or otherwise formed. Electrically conductive material may then be applied to the base material. For example, electrically conductive material may be bonded, adhered, or otherwise joined (e.g., glued, etc.) with the base material. As another example, electrically conductive material may be formed on a dielectric layer via any number of suitable techniques, such as the application of metallic ink or paint, liquid metal deposition, vapor deposition, welding, heat fusion, etc. In certain embodiments, a shield 115 may be formed as a tape that includes one or more dielectric layers and one or more electrically conductive layers.

A shield 115 may also be formed from a wide variety of suitable materials and/or combinations of materials. Examples of suitable electrically conductive materials that may be incorporated into a shield 115 include, but are not limited to, metallic material (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $1 \times 10^{-7}$ ohm meters at approximately 20° C. In certain embodiments, an electrically conductive material may have an electrical resistivity of less than approximately $3 \times 10^{-8}$ ohm meters at approximately 20° C. According to an aspect of the disclosure, a shield 115 may include electrically conductive material that is continuous in a longitudinal direction. As a result, the electrically conductive material may be utilized as a return conductor.

Examples of suitable materials that may be used to form a dielectric layer of a shield 115 include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, aramid materials, or dielectric material(s) that does not ordinarily conduct electricity. In certain embodiments, a dielectric layer may have a substantially uniform composition. Additionally, a dielectric layer may be fabricated in any number of manufacturing passes, such as a single manufacturing pass. Further, the dielectric layer may be solid, foamed, may be a composite, and/or may include one or more strength members, fibers, threads, or yarns. As desired, flame retardant material, smoke suppressants, and/or other desired substances may be blended or incorporated into a dielectric layer. Additionally, a shield 115 may include any suitable number of dielectric layers in combination with any suitable number of electrically conductive layers.

A shield 115 and/or various layers of a shield 115 may also be formed with a wide variety of suitable dimensions, such as any suitable thickness, width, and/or cross-sectional area. In certain embodiments, the dimensions of one or more electrically conductive layers incorporated into a shield 115 may be selected such that the shield 115 may provide a suitable DC resistance and/or power transmission capability. In this regard, the DC resistance and/or power capacity of the shield 115 may be approximately matched to that of one or more twisted pairs 105A-D. Additionally, one or more dimensions of an electrically conductive layer may be based at least in part upon the materials utilized to form the electrically conductive layer such that a desired DC resistance and/or power transmission capability may be attained.

An electrically conductive layer incorporated into a shield 115 may have any suitable thickness. For example, an electrically conductive layer may have a thickness of approximately 0.5, 1.0, 1.5, 2.0, 2.5, 3.0, 3.5, 4.0, 4.5, 5.0, 5.5, 6.0, 6.5, 7.0, or 7.5 mils, a thickness included in a range between any two of the above values, or a thickness bounded on either a minimum or maximum end by one of the above values. In addition to providing a return path, in certain embodiments, electrically conductive material having a thickness greater than a threshold value, such as approximately 2.0 mils, may provide enhanced electromagnetic shielding and/or signal performance for one or more of the twisted pairs 105A-D.

Other shield layers and/or components, such as a dielectric layer or a braided layer, may also have any suitable thickness. Additionally, regardless of the number of layers incorporated into a shield 115, the shield 115 may have any suitable overall thickness. For example, a shield 115 may have a thickness of approximately 0.5, 0.75, 1.0, 1.5, 2.0, 2.5, 3.0, 3.5, 4.0, 4.5, 5.0, 5.5, 6.0, 6.5, 7.0, 7.5, or 8.0 mils, a thickness included in a range between any two of the above values, or a thickness bounded on either a minimum or maximum end by one of the above values.

In certain embodiments, a shield 115 may be longitudinally curled or wrapped around one or more twisted pairs 105A-D. In other words, the shield 115 may extend along a longitudinal direction, and the shield 115 may have two longitudinally extending widthwise edges. The shield 115 may be positioned adjacent ton one or more twisted pairs 105A-D to be encapsulated by the shield 115, and the shield 115 may be curled or wrapped around the one or more twisted pairs 105A-D until one of the widthwise edged is brought into contact with another component of the shield 115 (e.g., the other widthwise edge, a portion of the shield 115 between the widthwise edges, etc.). In certain embodiments, the shield 115 may be wrapped once around the one or more twisted pairs 105A-D. In other words, even though a small overlap may be formed, the two widthwise edges may be in relatively close proximity to one another. In other embodiments, a shield 115A-D may be wrapped around one or more twisted pairs 105A-D such that a substantial overlap is formed. For example, a shield 115A-D may be double wrapped, triple wrapped, or wrapped any other suitable amount of time around one or more twisted pairs 105A-D. In this regard, an amount of electrically conductive material incorporated into a shield 115 may be increased. In yet other embodiments, a shield 115 may be partially wrapped around one or more twisted pairs 105A-D. Additionally, in certain embodiments, different layers of the shield 115 may be wrapped around one or more twisted pairs 105A-D by different amounts. For example, a first layer of the shield 115 (e.g., a dielectric layer, a first electrically conductive layer, etc.) may be completely wrapped around one or more twisted pairs 105A-D while a second layer of the shield 115 (e.g., an electrically conductive layer formed on a dielectric layer, a second electrically conductive layer different than a first electrically conductive layer, etc.) may be partially wrapped around one or more twisted pairs 105A-D.

As set forth above, one or more components of a shield 115 may also be formed with any suitable width. With a shield 115 that is longitudinally wrapped or curled around one or more twisted pairs 105A-D, a width of the shield 115 and/or various layers of the shield 115 may be selected based at least in part upon a desired amount of wrapping around the one or more twisted pairs 105A-D. For example, to form a complete wrapping around one or more twisted pairs 105A-D, a shield 115 may have a width that is approximately equal to or greater than an outer circumference of the one or more twisted pairs 105A-D encompassed by the shield 115. Any suitable width may be utilized that corresponds to a desired degree of wrapping. Additionally, in certain embodiments, a width of electrically conductive material may be determined based at least in part upon a desired DC resistance and/or power transmission capacity of the shield 115.

In other embodiments, a shield 115 may be helically wrapped around one or more twisted pairs 105A-D. In other words, the shield 115 may be wrapped at an angle relative to the longitudinal direction of the one or more twisted pairs 105A-D, and adjacent widthwise edges or adjacent wrapping of the shield 115 may overlap one another. Helically wrapped shields 115 may be formed with any suitable width and may be wrapped around one or more twisted pairs 105A-D at any suitable angle. In certain embodiments, the dimensions (e.g., thickness, width, etc.) and/or wrapping angle of a helically wrapped shield 115 may be selected in order to attain a desired DC resistance and/or power transmission capacity of the shield 115.

According to an aspect of the disclosure, a shield 115 may have a DC resistance that is approximately equal to that of one or more twisted pairs 105A-D of the cable 100. In other words, one or more twisted pairs 105A-D of the cable 100 intended to transmit a PoE power signal may have a first DC resistance. A shield 115 incorporated into the cable 100 may have a second DC resistance that is approximately equal to the first DC resistance. In this regard, the shield 115 may be utilized as a return path for the one or more twisted pairs 105A-D. As desired in various embodiments, a shield 115 may have a DC resistance that is balanced, matched, or approximately equal to any desired number of twisted pairs 105A-D. For example, a shield 115 may have a DC resistance that is approximately equal to the DC resistance of a single twisted pair. As another example, a shield 115 may have a DC resistance that is approximately equal to the combined DC resistance of a plurality of twisted pairs, such as two, three, or four twisted pairs. Indeed, the shield 115 may have a DC resistance that is approximately equal to that of any suitable downstream or positive power signal, regardless of the number of twisted pairs and/or twisted pairs conductors utilized to transmit the downstream power signal.

In certain embodiments, a plurality of shields may be incorporated into the cable 100. In the event that a plurality of shields are incorporated into a cable 100, one or more of the plurality of shields may be configured to function as a return path for one or more twisted pairs 105A-D incorporated into the cable 100. Each return path shield may have a respective DC resistance that is approximately equal to a corresponding DC resistance of the one or more twisted pairs associated with the shield. In this regard, multiple return paths may be formed by the various shield layers.

A wide variety of suitable combinations of shields may be utilized as desired in various embodiments. For example, as described in greater detail below with reference to FIG. 2, individual shields may be formed around each twisted pair (or any suitable number of twisted pairs) 105A-D. Each individual shield may serve as a return path for at least one twisted pair. For example, each individual shield may serve as a return path for the twisted pair encompassed or encapsulated by the shield. As another example, as described in greater detail below with reference to FIG. 3, different shields may be formed around different groups or subsets of the twisted pairs 105A-D. Each of the shields may then be configured to serve as a return path for one or more of the twisted pairs 105A-D. For example, if a shield is wrapped around two twisted pairs, the shield may be configured to serve as a return path for one or both of the twisted pairs, depending on whether one or both of the twisted pairs are intended to carry a downstream power signal.

In yet other embodiments, a plurality of different types of shields may be incorporated into a cable 100, and various shields may serve as return paths for different twisted pairs and/or groups of twisted pairs. As one non-limiting example, the cable 100 may include both individual shields and an overall shield. An individual shield may serve as a return path for a twisted pair while the overall shield serves as a return path for a different twisted pair. Alternatively, an individual shield may serve as a return path for a single conductor of a twisted pair while the overall shield may serve as a return path for both conductors of the twisted pair. Accordingly, different return paths may be utilized depending on an amount of power transmitted by the cable 100. As another example, the cable 100 may include both a shield formed around a subset of twisted pairs (e.g., a shield formed around two twisted pairs, etc.) and an overall shield. The shield formed around the subset of twisted pairs may serve as return path for a first twisted pair (or first group of twisted pairs) while the overall shield may serve as a return path for a second twisted pair (or second group of the twisted pairs). As yet another example, the cable 100 may include a plurality of shields, such as two shields (e.g., an individual shield and an overall shield, a shield formed around a group of pairs and an overall shield, etc.), that serve as a return path for a single twisted pair. Indeed, a wide variety of suitable combinations of shields may be utilized as desired in various embodiments, and each shield (or in some cases combination of shields) may be sized or designed to function as return path for any suitable conductors, twisted pairs, and/or combination of twisted pairs. Various shield combinations may permit a wide variety of different power signals to be transmitted via the cable 100 while the different shields function as appropriate return paths for the different power signals.

A wide variety of suitable methods and/or techniques may be utilized in order to form a shield 115 with a desired DC resistance. In other words, a wide variety of suitable shield constructions and/or formation techniques may be utilized in order to balance the DC resistance of shield 11 to one or more twisted pairs or conductors. In certain embodiments, one or more electrically conductive materials and/or dimensions of a shield 115 (e.g., width, thickness, cross-sectional area, etc.) may be selected such that the shield 115 has a desired DC resistance. For example, a shield 115 may be constructed from materials (e.g., metallic materials, etc.) that are sized to provide a desired DC resistance. As set forth in greater detail above, electrically conductive material may be formed with a wide variety of suitable dimensions.

In other embodiments, a shield 115 may be formed with a plurality of layers of electrically conductive material. For example, the shield 115 may include a plurality of metallic foil layers. In certain embodiments, a plurality of layers of electrically conductive material may be in contact with one another (e.g., stacked layers of metallic foil, etc.). In other embodiments, at least two layers of electrically conductive material may be separated by suitable dielectric layers. In certain embodiments, the plurality of electrically conductive layers may be formed from the same material. In other embodiments, at least two of the electrically conductive layers may be formed from different materials. The plurality of layers of electrically conductive material may increase the power transmission capabilities of the shield 115 and/or may allow a desired DC resistance to be achieved. In other embodiments, a shield 115 may be wrapped multiple times around one or more twisted pairs 105A-D. In other words, the shield 115 may be formed with a width that permits the shield 115 to overlap itself when it is longitudinally curled or wrapped around one or more twisted pairs 105A-D. Any desired number of wrapping may be formed by the shield 115, such as two, three, or some other number of wrappings. The use of multiple wrappings may increase an amount of electrically conductive material in a shield 115, thereby increasing the power transmission capability of the shield 115 and/or allowing a desired DC resistance to be achieved.

In yet other embodiments, a shield 115 may be formed with a one or more strips of electrically conductive material, such as a one or more longitudinally extending or helically wrapped strips of electrically conductive material. In certain embodiments, the one or more strips may be formed on and/or in addition to an electrically conductive layer. For example, a shield 115 may include an electrically conductive layer having a substantially uniform thickness, such as a relatively flat electrically conductive layer. One or more strips of electrically conductive material may then be formed in addition to the electrically conductive layer. For example, one or more strips may be formed on the electrically conductive layer. In certain embodiments, each of the strips may be longitudinally continuous. Additionally, each of the strips may have any suitable dimensions, such as any suitable thickness, width, and/or cross-sectional area. Further, in certain embodiments, each of the strips may be formed from the same material. In other embodiments, at least two strips may be formed from different materials. As desired, a strip may also be formed from the same material as the electrically conductive layer or, alternatively, a strip may be formed from a different material than the electrically conductive layer. The use of one or more strips may increase an amount of electrically conductive material in a shield 115, thereby increasing the power transmission capability of the shield 115 and/or allowing a desired DC resistance to be achieved.

In other embodiments, one or more electrically conductive layers of a shield 115 may be corrugated or otherwise manipulated in order to provide a desired DC resistance. The addition of corrugations may increase the DC resistance of an electrically conductive material, and any number of suitable corrugations may be utilized as desired. Corrugations may also be formed with any suitable dimensions. For example, corrugations may be formed with any suitable longitudinal length and/or height (e.g., distance of projection from a base, etc.). Additionally, any suitable spacings or gaps may be positioned between adjacent corrugations. In yet other embodiments, a shield 115 may include a combination of different types of shield layers in combination with one another. The DC resistance of the shield 115 may be based on the combined resistances of the contacting layers. For example, a metallic foil layer may be positioned in contact with a braided layer. A wide variety of different shield layer combinations may be utilized as desired in various embodiments in order to attain a desired DC resistance.

As a result of utilizing one or more shields as return conductors, the power transmission capabilities of a twisted pair PoE cable 100 may be enhanced relative to conventional PoE cables. In conventional cables, different pairs are utilized for positive and return signals. Accordingly, multiple pairs are required in order to transmit a power signal. However, by utilizing shield layers to transmit a return signal, a greater number of twisted pairs 105A-D can be utilized to transmit power signals, thereby increasing the current and/or power capacity of the cable 100. Further, in certain embodiments, the use of return path shields may permit a reduction in the conductor sizes of one or more twisted pairs 105A-D. Although smaller conductors may be capable of transmitting less power than larger conductors, the use of return path shields allow a greater number of conductors to be utilized to transmit a similar power signal as larger conductors. Accordingly, the power transmission capabilities of a cable with smaller conductors may be similar to those of conventional PoE cables, thereby permitting the cable to be installed in smaller spaces.

Additionally, in certain embodiments, a wide variety of suitable techniques may be utilized to terminate a return path shield at a twisted pair connector, such as an RJ45 connector. In certain embodiments, a clamping ring may be attached over the shield material, and the clamping ring may be connected to a return path or earth ground. Additionally, in certain embodiments, a shield may be sandwiched between inner and outer jackets (or between two layers of a jacket, thereby permitting easier termination of the shield to a connector without modifying existing connector designs to accommodate the shield.

With continued reference to FIG. 1, a jacket 110 may enclose the internal components of the cable 100, seal the cable 100 from the environment, and/or provide strength and structural support. The jacket 110 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. For example, a PVC jacket or a jacket containing PVC material may be used in certain embodiments. The jacket 110 may be formed as a single layer or, alternatively, as multiple layers. In certain embodiments, the jacket 110 may be formed from one or more layers of foamed material. As desired, the jacket 110 can include flame retardant and/or smoke suppressant materials. The jacket 110 may be formed to result in a round cable or a cable having an approximately circular cross-section; however, the jacket 110 and internal components may be formed to result in other desired shapes, such as an elliptical, oval, or rectangular shape. The jacket 110 may also have a wide variety of suitable dimensions, such as any suitable or desirable outer diameter and/or any suitable or desirable wall thickness. In various embodiments, the jacket 110 can be characterized as an outer jacket, an outer sheath, a casing, a circumferential cover, or a shell.

An opening enclosed by the jacket 110 may be referred to as a cable core, and the twisted pairs 105A-D and/or other cable components (e.g., one or more shields, a separator, etc.) may be disposed within the cable core. Although a single cable core is illustrated in the cable 100 of FIG. 1, a cable may be formed to include multiple cable cores. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired. For example, as described in greater detail below with reference to FIG. 4, a separator may be positioned between two or more of the twisted pairs 105A-D.

As desired in various embodiments, any number of suitable elements of a cable 100 may be configured to provide electromagnetic shielding for the twisted pairs 105A-D. For example, any number of shields (such as shield 115, etc.) and/or separator may provide electromagnetic shielding for any number of twisted pairs 105A-D. The incorporation of electrically conductive material and/or other shielding material (e.g., semi-conductive material, dielectric shielding material, etc.) into a shield 115 and/or other cable components (e.g., a separator, etc.) may provide electromagnetic shielding which may reduce or limit cross-talk, noise, and/or other detrimental effects on one or more twisted pairs 105A-D.

As desired in various embodiments, a wide variety of other materials may be incorporated into the cable 100. For example, a cable may include any number of conductors, twisted pairs, optical fibers, and/or other transmission media. A cable may also include a wide variety of separators positioned between two or more twisted pairs, separators or dielectric films positioned between the individual conductors of one or more twisted pairs, strength members, swellable materials (e.g., aramid yarns, blown swellable fibers, etc.), insulating materials, dielectric materials, flame retardants, flame suppressants or extinguishants, gels, and/or other materials. The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

FIG. 2 illustrates a cross-section of another example cable 200 that may be suitable for use in PoE applications. The cable 200 of FIG. 2 may include components that are similar to those of the cable 100 described above with reference to FIG. 1. In particular, the cable 200 may include a plurality of longitudinally extending twisted pairs 205A-D, and at least one of the plurality of twisted pairs 205A-D may be configured to transmit a power signal. The twisted pairs 205A-D may be positioned within a cable core defined by a jacket 210 formed around the twisted pairs 205A-D. Additionally, at least one shield may be incorporated into the cable 200.

In contrast to the cable 100 illustrated in FIG. 1, the cable 200 of FIG. 2 is illustrated as including a plurality of individual shields 215A-D. In particular, a respective individual shield 215A-D is formed around each of the twisted pairs 205A-D. For example, a first shield 215A may be formed around a first twisted pair 205A, a second shield 215B may be formed around a second twisted pair 205B, a third shield 215C may be formed around a third twisted pair 205C, and a fourth shield 215D may be formed around a fourth twisted pair 205D. In other embodiments, respective individual shields may be provided for a first subset of the twisted pairs 205A-D while another subset of the twisted pairs 205A-D does not include individual shields.

As desired, any number of the individual shields 215A-D may be configured to function as a return path conductor. For example, each individual shield 215A-D may serve as a respective return path for the twisted pair 205A-D associated with the shield 215A-D. As such, each individual shield 215A-D may have a DC resistance that is approximately equal to that of the associated twisted pair 205A-D. In other embodiments, multiple individual shields may serve as a return path for a single twisted pair. For example, two individual shields (e.g., shield 215A and shield 215B, etc.) may have a combined DC resistance that is approximately equal to that of a single twisted pair (e.g., twisted pair 205A). As another example, separate individual shields may serve as return paths for individual twisted pair conductors. Indeed, a wide variety of twisted pair and shield combinations may be utilized to transmit power where one or more shields serve as return path conductors.

In certain embodiments, the cable 200 may optionally include an overall wrap 220 formed around the plurality of twisted pairs 205A-D and individual shields 215A-D. In certain embodiments, the outer wrap 220 may be a binder that holds the twisted pairs 205A-D together. In other embodiments, the outer wrap 220 may be formed as a shield, such as an overall shield. Accordingly, in certain embodiments, the cable 200 may include one or more shields in addition to the individual shields 215A-D (e.g., an overall shield, group shields, etc.). As explained in greater detail above with reference to FIG. 1, any suitable shields and/or combinations of shields may be configured to be returned paths for any associated twisted pairs and/or groupings of twisted pairs. For example, in a four pair twisted cable, one twisted pair may be configured to transmit power while the outer shield serves as a return path. The individual shields may then serve an electromagnetic shielding function. As another example, one twisted pair may be configured to transmit power while a combination of shields serves as a balanced return path. A wide variety of other shield configurations and/or combinations may be balanced to any suitable number of twisted pairs. Additionally, as set forth in greater detail above, each shield incorporated into the cable 200 may include a wide variety of suitable constructions.

FIG. 3 illustrates a cross-section of another example cable 300 that may be suitable for use in PoE applications. The cable 300 of FIG. 3 may include components that are similar to those of the cable 100 described above with reference to FIG. 1. In particular, the cable 300 may include a plurality of longitudinally extending twisted pairs 305A-D, and at least one of the plurality of twisted pairs 305A-D may be configured to transmit a power signal. The twisted pairs 305A-D may be positioned within a cable core defined by a jacket 310 formed around the twisted pairs 305A-D. Additionally, at least one shield may be incorporated into the cable 300.

In contrast to the cable 100 illustrated in FIG. 1, the cable 300 of FIG. 3 is illustrated as including a plurality of shields 315A, 315B. Each of the plurality of shields 315A. 315B may be formed around a suitable subset of the twisted pairs 305A-D. For example, a first shield 315A may be formed around two twisted pair 305A, 305B, and a second shield 315B may be formed around two different twisted pairs 305C, 305D.

Any number of group shields 315A, 315B may be configured to function as a return path conductor. For example, each shield 315A, 315B may serve as a return path for one or more twisted pairs 205A-D associated with the shield 315A. 315B. As such, each shield 315A, 315B may have a DC resistance that is approximately equal to that of the associated twisted pair(s). In other embodiments, multiple shields 315A, 315B may serve as a return path for a single twisted pair. Indeed, a wide variety of twisted pair and shield combinations may be utilized to transmit power where one or more shields serve as return path conductors.

In certain embodiments, the cable 300 may optionally include an overall wrap 320 formed around the plurality of twisted pairs 305A-D and shields 315A, 315B. In certain embodiments, the outer wrap 320 may be a binder that holds the twisted pairs 305A-D together. In other embodiments, the outer wrap 320 may be formed as a shield, such as an overall shield. Accordingly, in certain embodiments, the cable 300 may include one or more shields in addition to the group shields 315A, 315B. As explained in greater detail above with reference to FIG. 1, any suitable shields and/or combinations of shields may be configured to be return paths for any associated twisted pairs and/or groupings of twisted pairs. For example, in a four pair twisted cable, each group shield 315A, 315B may serve as a return path for a respective single twisted pair while the overall shield 320 serves as a return path for a third twisted pair. A wide variety of other shield configurations and/or combinations may be balanced to any suitable number of twisted pairs. Additionally, as set forth in greater detail above, each shield incorporated into the cable 300 may include a wide variety of suitable constructions.

Figure 4:
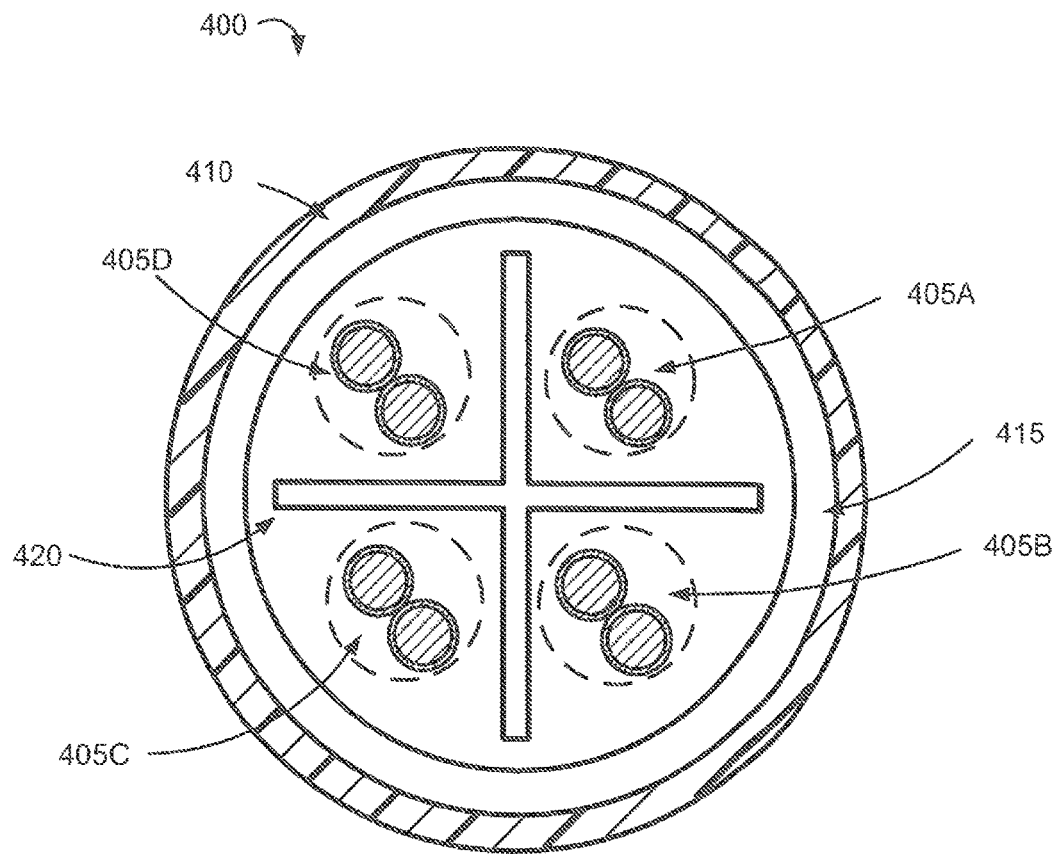

FIG. 4 illustrates a cross-section of another example cable 400 that may be suitable for use in PoE applications. The cable 400 of FIG. 4 may include components that are similar to those of the cable 100 described above with reference to FIG. 1. In particular, the cable 400 may include a plurality of longitudinally extending twisted pairs 405A-D, and at least one of the plurality of twisted pairs 405A-D may be configured to transmit a power signal. The twisted pairs 405A-D may be positioned within a cable core defined by a jacket 410 formed around the twisted pairs 405A-D. Additionally, at least one shield 415 may be incorporated into the cable 400.

In additionally, the cable 400 of FIG. 4 is illustrated as including a separator 420, spline, or filler positioned between two or more of the twisted pairs 405A-D. As desired, a wide variety of suitable separators may be incorporated into PoE twisted pair cables. A separator 420 may be disposed within the cable core and configured to orient and or position one or more of the twisted pairs 405A-D. The orientation of the twisted pairs 405A-D relative to one another may provide beneficial signal performance. As desired in various embodiments, the separator 420 may be formed in accordance with a wide variety of suitable dimensions, shapes, or designs. For example, the separator 420 may be formed as an X-shaped separator or cross-fill. In other embodiments, a rod-shaped separator, a flat tape separator, a flat separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized.

In certain embodiments, the separator 420 may be continuous along a longitudinal length of the cable 400. In other embodiments, the separator 420 may be non-continuous or discontinuous along a longitudinal length of the cable 400. In other words, the separator 420 may be separated, segmented, or severed in a longitudinal direction such that discrete sections or portions of the separator 420 are arranged longitudinally (e.g., end to end) along a length of the cable 400. Use of a non-continuous or segmented separator may enhance the flexibility of the cable 400, reduce an amount of material incorporated into the cable 400, and/or reduce cost.

In certain embodiments, the separator 420 may be characterized as having projections that extend from a central portion or spine. For example, a cross-filler may be viewed as having a plurality of projections that extend in different directions from a central portion, spine, or central point. In certain embodiments, the projections of a separator 420 may be continuous along a longitudinal length of the separator 420 (or a separator section in a severed separator). In other embodiments, one or more projections of a separator 420 may have sections or portions that are spaced along a longitudinal length of the separator 420, and any suitable longitudinal gap or spacing may be positioned between longitudinally adjacent sections of a projection. Longitudinal gaps utilized between section of a projection may have any suitable lengths or sized, and gaps may be approximately equal in length and/or spacing (e.g., arranged in accordance with a desired pattern, etc.) or alternatively, arranged in a random or pseudo-random manner. The use of longitudinal spaces between adjacent sections of a projection or between adjacent sets of projections (e.g., spaced grouping of projections or prongs) may facilitate a reduction in material utilized to form the separator 420 and/or may enhance the flexibility of the separator 420 and the cable 400.

In certain embodiments, projections may extend from a central portion in different sets of one or more directions at longitudinally spaced locations. For example, a first set of one or more projections may extend in a first set of respective directions. A second set of one or more projections longitudinally adjacent to the first set may extend in a second set of respective directions, and at least one direction of extension in the second set may be different than the direction(s) of extension included in the first set. Regardless of whether longitudinal gaps are positioned between various sets of longitudinally spaced projections, any suitable number of projections (e.g., one, two, three, four, etc.) may extend at each longitudinally spaced location. In certain embodiments, directions of extension may be varied in order to reduce material utilized to form the separator 420 while still providing a separator 420 with a desired overall cross-sectional shape. For example, a separator 420 may function as a cross-filler that includes projections extending in four directions along a longitudinal length; however, at any given location along the longitudinal length, projections may not extend in all four directions. A wide variety of suitable configurations of projections may be utilized as desired.

For a cross-filler or other separator 420 that includes projections that extend between adjacent sets of twisted pairs 405A-D, each projection may be formed with a wide variety of suitable dimensions. For example, each projection may have a wide variety of suitable cross-sectional shapes at a given cross-sectional point perpendicular to a longitudinal direction of the separator 420, cross-sectional shapes taken along the longitudinal direction (e.g., rectangular, square, semi-circular, parallelogram, trapezoidal, triangular, etc.), cross-sectional areas, thicknesses, distances of projection (i.e., length of projection from the central portion), and/or longitudinal lengths. In certain embodiments, each projection may be formed with substantially similar dimensions. In other embodiments, at least two projections may be formed with different dimensions. Similarly, in certain embodiments, each projection may be formed from similar materials. In other embodiments, at least two projections may be formed from different materials.

A wide variety of suitable techniques may be utilized to form a separator 420. For example, in certain embodiments, material may be extruded, cast, molded, or otherwise formed into a desired shape to form the separator 420. In other embodiments, various components of a separator 420 may be separately formed, and then the components of the separator 420 may be joined or otherwise attached together via adhesive, bonding (e.g., ultrasonic welding, etc.), or physical attachment elements (e.g., staples, pins, etc.). In yet other embodiments, a tape may be provided as a substantially flat separator or formed into another desired shape utilizing a wide variety of folding and/or shaping techniques. For example, a relatively flat tape may be formed into an X-shape or cross-shape as a result of being passed through one or more dies. In other embodiments, a plurality of tapes may be combined in order to form a separator having a desired cross-sectional shape. For example, two tapes may be folded at approximately ninety degree angles and bonded together to form a cross-shaped separator. As another example, four tapes may be folded at approximately ninety degree angles and bonded to one another to form a cross-shaped separator. A wide variety of other suitable construction techniques may be utilized as desired. Additionally, in certain embodiments, a separator 420 may be formed to include one or more hollow cavities that may be filled with air or some other gas, moisture mitigation material, one or more optical fibers, one or more metallic conductors (e.g., a drain wire, etc.), shielding, or some other appropriate material or element.

The separator 420 (and/or various segments, projections, and/or other components of the separator 420) may be formed from a wide variety of suitable materials and/or combinations of materials as desired in various embodiments. For example, the separator 420 may include paper, metallic material (e.g., aluminum, ferrite, etc.), alloys, semi-conductive materials, ferrite ceramic materials, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 420 may be filled, unfilled, foamed, solid, homogeneous, or inhomogeneous and may or may not include additives (e.g., flame retardant and/or smoke suppressant materials). As desired, the separator 420 may include one or more strength members, fibers, threads, and/or yarns. Similarly, flame retardant material, smoke suppressants, and/or other desired substances may be blended or incorporated into a separator 420. In certain embodiments, a separator 420 may include or incorporate one or more shielding materials, such as electrically conductive shielding material, semi-conductive material, and/or dielectric shielding material (e.g., ferrite ceramic material, etc.). As a result of incorporating electrically conductive material, the separator 420 may providing shielding between two or more of the twisted pairs 405A-D.

Additionally, in certain embodiments, one or more pair conductor separators (not shown) may be positioned between the individual conductors of a twisted pair (generally referred to as twisted pair 405). As desired, shielding material may be optionally incorporated into one or more pair conductor separators positioned between the conductors of respective twisted pairs 405A-D. In certain embodiments, each pair conductor separators may be woven helically with the individual conductors or conductive elements of an associated twisted pair 405. In other words, a pair conductor separator may be helically twisted with the conductors of a twisted pair 405 along a longitudinal length of the cable 400.

Each pair conductor separator may have a wide variety of suitable constructions, components, and/or cross-sectional shapes. For example, each pair conductor separator may be formed as a dielectric film that is positioned between the two conductors of a twisted pair 405. In other embodiments, a pair conductor separator may be formed with an H-shape, an X-shape, or any other suitable cross-sectional shape. For example, the pair conductor separator may be formed to create or define one or more channels in which the twisted pair conductors may be situated. In this regard, the pair conductor separator may assist in maintaining the positions of the twisted pair conductors when stresses are applied to the cable, such as pulling and bending stresses. Additionally, in certain embodiments, a pair conductor separator may include a first portion positioned between the conductors of a twisted pair 405 and one or more second portions that form a shield around an outer circumference of the twisted pair 405. The first portion may be helically twisted between the conductors, and the second portion(s) may be helically twisted around the conductors as the pair conductor separator and the pair 405 are twisted together. The first portion or dielectric portion may assist in maintaining spacing between the individual conductors of the twisted pair 405 and/or maintaining the positions of one or both of the individual conductors. The second portion(s) or shielding portions may extend from the first portion, and the second portion(s) may be individually and/or collectively wrapped around the twisted pair conductors in order to form a shield layer. In certain embodiments, the second portion(s) may include electrically conductive material that may be configured as a return path for the twisted pair 405. For example, the second portion(s) may effectively form an individual shield that may be utilized as a return path.

Similar to the cable 100 of FIG. 1, any of the cables 200, 300, 400 of FIGS. 2-4 may also include a wide variety of other materials. For example, a cable may include any number of separators, pair conductor separators, twisted pairs, optical fibers, and/or other transmission media, strength members, swellable materials (e.g., aramid yarns, blown swellable fibers, etc.), insulating materials, dielectric materials, flame retardants, flame suppressants or extinguishants, gels, and/or other materials. The cables 200, 300, 400 illustrated in FIGS. 2-4 are provided by way of example only. Embodiments of the disclosure contemplate a wide variety of other cables and cable constructions. These other cables may include more or less components than the cables 200, 300, 400 illustrated in FIGS. 2-4. Additionally, certain components may have different dimensions and/or materials than the components illustrated in FIGS. 2-4.

As set forth above, a shield may be formed with a wide variety of suitable constructions. For example, any of the shields illustrated in the cables 100, 200, 300, 400 of FIGS. 1-4 may be formed with a wide variety of suitable structures. Accordingly, each of the shields of FIGS. 1-4 are intentionally illustrated with a generic construction that may include a wide variety of suitable layers, materials, and/or dimensions. FIGS. 5A-5G are cross-sectional views of example shield constructions that may be utilized as return conductor shields in twisted pair PoE cables, according to illustrative embodiments of the disclosure. Any of the example constructions illustrated in FIGS. 5A-5G, as well as a wide variety of other suitable constructions, may be applicable to any of the shields illustrated in the cables 100, 200, 300, 400 of FIGS. 1-4. Additionally, it will be appreciated that the shield constructions illustrated in FIGS. 5A-5G are provided by way of non-limiting example only.

Turning now to FIG. 5A, a first example shield construction 500 is illustrated. The shield 500 is illustrated as having a single layer of electrically conductive material. For example, the shield 500 may be formed as a metallic foil or other suitable single layer construction. The shield 500 may be formed from a wide variety of suitable materials (e.g., copper, aluminum, etc.) and/or may include a wide variety of suitable dimensions. For example, the shield 500 may include any suitable thickness and/or cross-sectional area. In certain embodiments, one or more dimensions of the shield 500 may be based at least in part upon a desired DC resistance for the shield 500.

Additionally, in operation the shield 500 may be wrapped around one or more twisted pairs of a cable. In certain embodiments, the shield 500 may be partially wrapped or wrapped approximately once around the one or more twisted pairs. In other embodiments, the shield 500 may overlap itself when it is wrapped around the one or more twisted pairs. In other words, the shield 500 may be wrapped more than once around the one or more twisted pairs. For example, the shield may be wrapped one and a half times, two times, three times, or any other suitable number of times around the one or more twisted pairs. By including an overlap region and/or multiple wrapping, an amount of electrically conductive material incorporated into a shield may be increased.

Although the shield 500 of FIG. 5A is illustrated as having a single layer, in other embodiments, the shield 500 may include a plurality of layers of electrically conductive material that are in contact with one another. For example, the shield 500 may include a plurality of stacked metallic foil layers. Any number of electrically conductive layers may be utilized to form the shield 500. Additionally, each layer may be formed from a wide variety of suitable materials and may have a wide variety of suitable dimensions (e.g., thickness, cross-sectional area, etc.).

FIG. 5B illustrates an example shield construction 505 that may be utilized in a PoE cable. The shield 505 may include at least one electrically conductive layer 510 (e.g., a metallic layer, etc.) that includes a plurality of corrugations 512. The addition of corrugations 512 may increase the DC resistance of the electrically conductive layer 510, and any number of suitable corrugations 512 may be utilized as desired. Corrugations 512 may also be formed with any suitable dimensions. For example, corrugations may be formed with any suitable longitudinal length "L" and/or height (e.g., distance of projection from a baseline point of the electrically conductive layer, etc.). Additionally, any suitable spacings or gaps "G" may be positioned between adjacent corrugations.

FIG. 5C illustrates an example shield construction 515 that includes a dielectric layer 517 and an electrically conductive layer 520 formed on the dielectric layer 517. In certain embodiments, the electrically conductive layer 520 may be formed on an inner surface of the dielectric layer 517 when the shield 515 is wrapped around one or more twisted pairs. In this regard, the electrically conductive layer 520 will not be in contact with electrically conductive layers of adjacent shield structures, such as shields formed around other twisted pairs. Thus, various shields may serve as electrically isolated return paths. FIG. 5D illustrates an example shield construction 525 in which an electrically conductive layer 530 is sandwiched between two dielectric layers 532, 534. The two dielectric layers 532, 534 may facilitate electrically isolation of the shield 525 from other shields. In various embodiments, shields (e.g., shield 515, shield 525, etc.) may be formed with any suitable number of electrically conductive layers and dielectric layers. Additionally, each layer may have any suitable dimensions, and a shield may be wrapped around one or more twisted pairs by any suitable amount or any desired number of times.

Figure 5E:
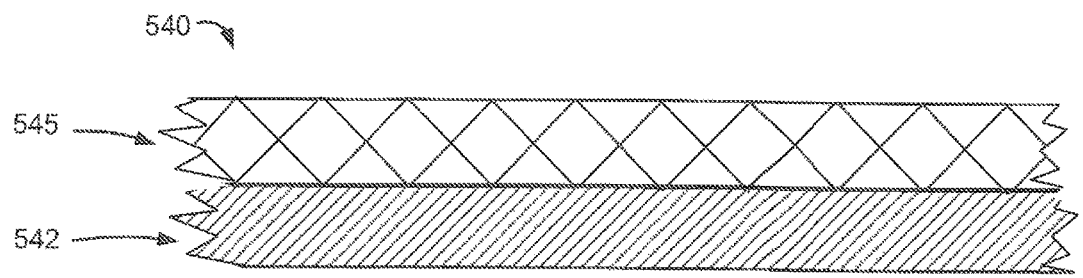
Figure 5F:
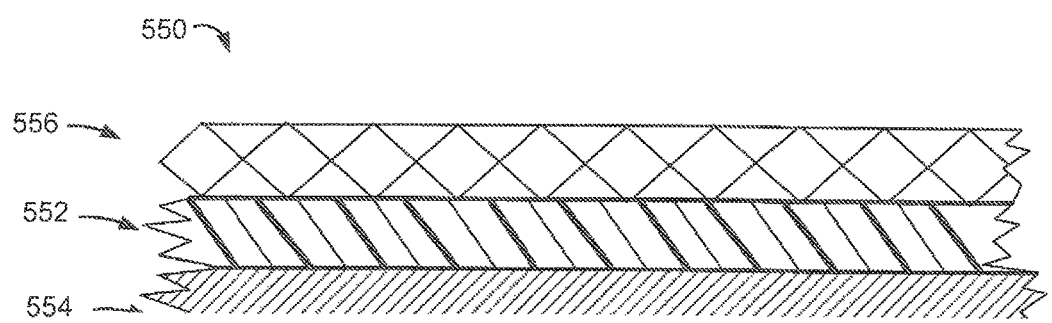

FIG. 5E illustrates an example shield construction 540 that includes both an electrically conductive layer 542, such as one or more metallic foil layers, and a braided shield layer 545. As shown in FIG. 5E, in certain embodiments, the electrically conductive layer 542 may be in contact with the braided shield layer 545. Accordingly, the combined layers may function as a single return path. In other embodiments, as shown in the shield construction 550 of FIG. 5F, a dielectric layer 552 may be positioned between an electrically conductive layer 554 and a braided shield layer 545. As desired, a single layer of the shield 550, such as the electrically conductive layer 555, may function as a return path or return conductor while the remainder of the shield 556 provides electromagnetic shielding. A braided shield 545, 556 may be formed with any suitable materials and/or with any suitable number of strands that are braided or woven together. Each strand may have any suitable dimensions (e.g., diameter, cross-sectional area, etc.), and a braided shield 545, 556 may include any suitable number of braided layers.

Figure 5G:
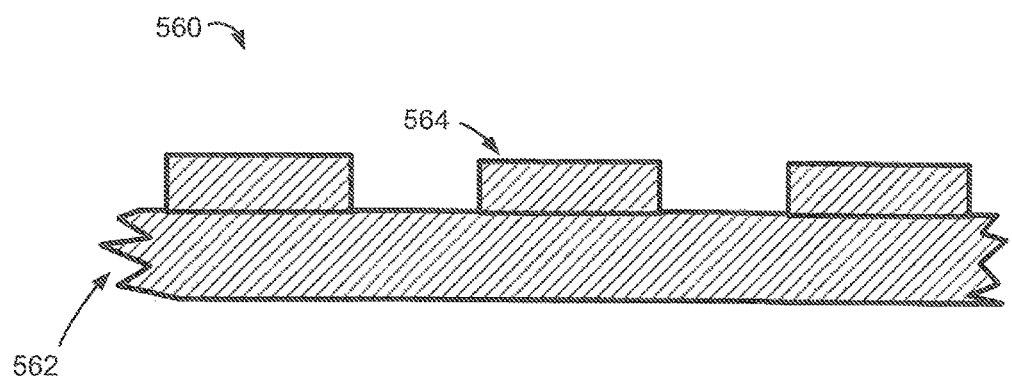

FIG. 5G illustrates an example shield construction 560 that includes one or more strips of electrically conductive material. For example, the shield 560 may include base layer 562 of material, such as a base layer of electrically conductive material. One or more strips 564 of electrically conductive material, such as a one or more longitudinally extending or helically wrapped strips of electrically conductive material, may be formed on the base layer 562. In certain embodiments, each of the strips 564 may be longitudinally continuous along the shield 560. Additionally, each of the strips 564 may have any suitable dimensions, such as any suitable thickness, width, and/or cross-sectional area. Further, in certain embodiments, each of the strips 564 may be formed from the same material. In other embodiments, at least two strips 564 may be formed from different materials. As desired, a strip 564 may also be formed from the same material as an electrically conductive base layer 562 or, alternatively, a strip 564 may be formed from a different material than an electrically conductive base layer 562. The use of one or more strips 564 may increase an amount of electrically conductive material in a shield 560, thereby increasing the power transmission capability of the shield 560 and/or allowing a desired DC resistance to be achieved.

Figure 6:
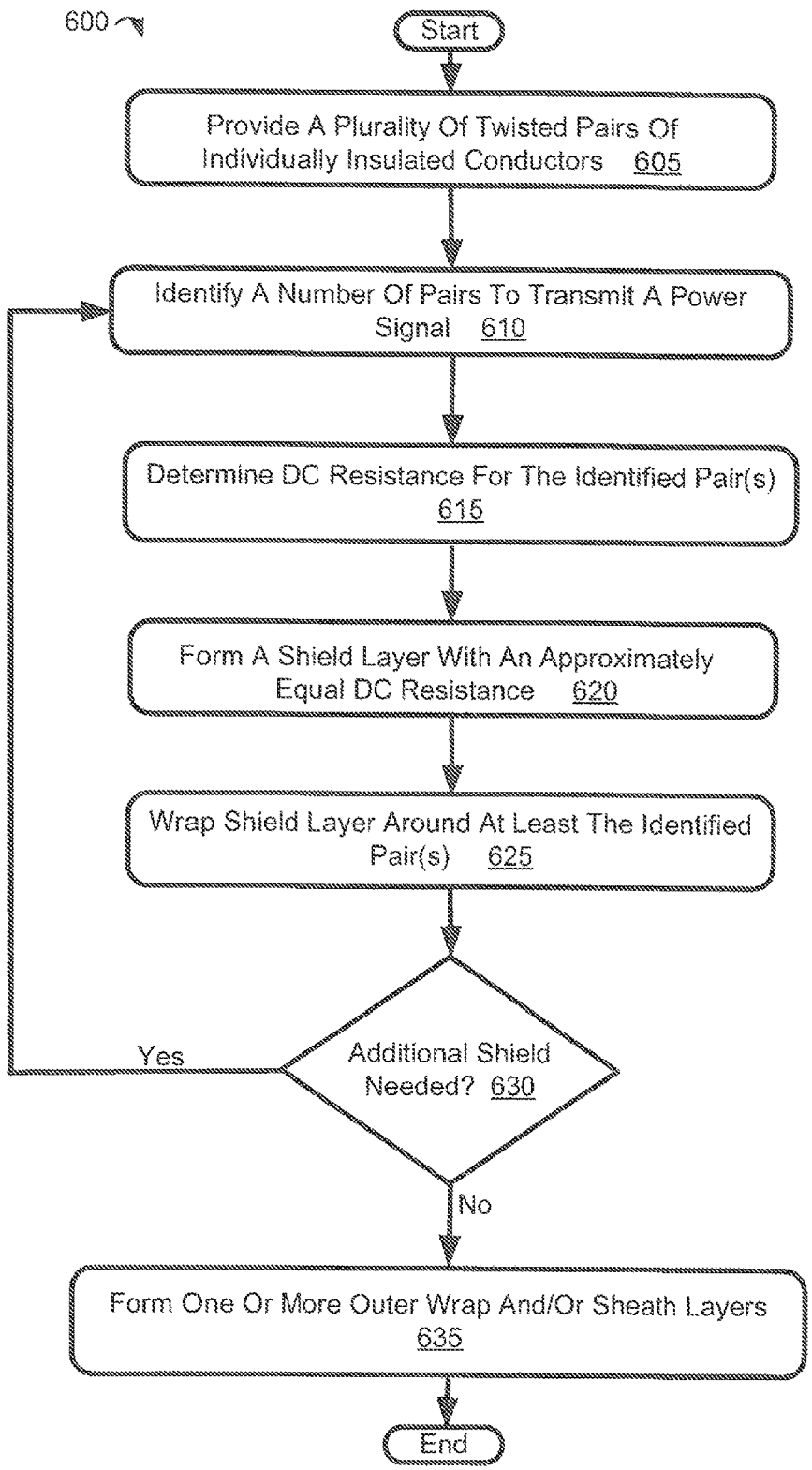
FIG. 6 is a flowchart of an example method for forming a twisted pair cable in accordance with various embodiments of the disclosure.

FIG. 6 is a flowchart of an example method 600 for forming a twisted pair communications cable in accordance with various embodiments of the disclosure. The method 600 may be utilized to form one or more of the cables suitable for use in PoE applications, such as any of the cables 100, 200, 300, 400 illustrated in FIGS. 1-4. The method 600 may begin at block 605, in which a plurality of twisted pair conductors may be provided. Any number of twisted pairs may be provided as desired in various embodiments, such as four twisted pairs. Additionally, one or more of the twisted pairs may be sized and/or intended to transmit one or more suitable power signals. In certain embodiments, one or more twisted pairs may be sized such that the twisted pair(s) can transmit a desired power signal. For example, one or more twisted pairs may be formed with conductors that are 22 AWG or greater, although other suitable conductor sizes may be utilized.

A wide variety of suitable methods may be utilized to provide a plurality of twisted pairs. For example, in certain embodiments, electrically conductive material may be drawn to conductors having an appropriate size (e.g., drawn through dies, etc.) and insulation may be formed around the conductors. Pairs of conductors may then be twisted together at any desirable twist rate and/or combinations of twist rates. Additionally, in certain embodiments, the plurality of twisted pairs may be formed during cable construction (e.g., in an in-line cable construction process). In other embodiments, the plurality of twisted pairs may be formed prior to cable construction (e.g., in a separate process in which the resulting twisted pairs are taken up on reels and subsequently provided to a cabling process that assembles and jackets a cable). In yet other embodiments, preformed twisted pairs may be obtained from an outside source or third party and provided to a cabling process.

At block 610, one or more pairs included in the plurality of provided twisted pairs may be identified for transmitting an electrical power signal. Any desired number of pairs and/or pair conductors may be utilized to transmit a desired power signal. At block 615, a DC resistance for the identified one or more twisted pairs may be determined. A shield layer (or a combination of shield layers) may then be formed at block 620 with a DC resistance that is approximately equal to the DC resistance of the identified pair(s). As a result, the shield layer(s) may be utilized as a return path conductor for the identified pair(s).

At block 625, the shield layer(s) may be incorporated into a cable. For example, a shield layer may be wrapped around at least one of the identified twisted pairs. As desired, a shield layer may be wrapped around any suitable number of twisted pairs. For example, the shield layer may be wrapped around a single twisted pair (i.e., an individual shield), around a desired subset of the twisted pairs (i.e., a group shield), or around all of the plurality of twisted pairs (i.e., an overall shield).

At block 630, a determination may be made as to whether any additional shields are needed or desired for a cable. In other words, a determination may be made as to whether any additional return path shields are intended to be incorporated into the cable. A separate or additional shield may function as a return path for other suitable twisted pairs or groupings of twisted pairs. If it is determined at block 630 that an additional shield is desired or needed, then operations may continue at block 610 and a number of twisted pairs to be associated with the additional shield may be identified. Operations may continue until a desired number of shields has been incorporated into a cable. However, if it is determined at block 630 that no additional shields are desired, then operations may continue at block 635.

At block 635, one or more outer wraps and/or sheaths may be formed around the other components of the cable. For example, one or more suitable outer binders, shields that are not intended to function as return conductors (e.g., separate braided shields, shields that limit alien crosstalk, etc.), and/or other suitable outer wraps may be formed around the plurality of twisted pairs, underlying shield layers, and/or other internal cable components (e.g., a separator, etc.). As another example, an outer jacket may be extruded or otherwise formed around the other cable components. As an alternative to forming an outer jacket, the cable may be provided in unjacketed form as a component to a larger cable. For example, the cable may be provided as a subcable or subcomponent to be combined with other twisted pair, fiber optic, and/or other cables, and a jacket may be formed around the combined subcomponents. The method may end following block 635.

As desired, the method 600 may include more or less operations than those illustrated in FIG. 6. For example, one or more additional components may be incorporated into a cable. Additionally, as desired, certain operations of the method 600 may be formed in parallel or in a different order than that set forth in FIG. 6. Indeed, the method 600 is provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A communications cable, comprising:
   four twisted pairs of individually insulated conductors extending in a longitudinal direction, wherein at least one of the four twisted pairs is configured to transmit a power signal and has a first direct current resistance;
   a shield comprising longitudinally continuous electrically conductive material, the shield formed around at least a portion of the four twisted pairs and the shield having a second direct current resistance that is approximately equal to the first direct current resistance; and
   a jacket formed around the four twisted pairs and the shield.

2. The communications cable of claim 1, wherein the shield functions as a return conductor for the at least one twisted pair configured to transmit a power signal.

3. The communications cable of claim 1, wherein the at least one of the four twisted pairs comprises a plurality of the four twisted pairs, the plurality of the four twisted pairs having the first direct current resistance.

4. The communications cable of claim 1, wherein the shield comprises an overall shield formed around the four twisted pairs.

5. The communications cable of claim 1, wherein the at least one of the four twisted pairs comprises a single twisted pair, and
   wherein the shield comprises an individual shield formed around the single twisted pair.

6. The communications cable of claim 1, wherein the at least one of the four twisted pairs configured to transmit a power signal comprises a first portion of the four twisted pairs configured to transmit a first power signal and having the first direct current resistance, wherein the shield comprises a first shield formed around the first portion of the four twisted pairs and having the second direct current resistance, and further comprising:
   a second portion of the four twisted pairs configured to transmit a second power signal and having a third direct current resistance; and
   a second shield formed around the second portion of the four twisted pairs and having a fourth direct current resistance approximately equal to the third direct current resistance.

7. The communications cable of claim 6, wherein the first portion of the four twisted pairs comprises a first twisted pair, the first shield comprises an individual shield formed around the first twisted pair, the second portion of the four twisted pairs comprises a second twisted pair, and the second shield comprises an individual shield formed around the second twisted pair.

8. The communications cable of claim 6, wherein each of the first shield and the second shield respectively comprise:
   a first layer comprising longitudinally continuous electrically conductive material; and
   a layer of dielectric material formed around the first layer.

9. The communications cable of claim 1, wherein the shield comprises a corrugated shield.

10. The communications cable of claim 1, wherein the longitudinally continuous electrically conductive material comprises a first layer of the shield, and
    wherein the shield comprises a second layer of material.

11. The communications cable of claim 1, wherein the shield comprises a plurality of shields, and the second direct current resistance comprises a combined resistance of the plurality of shields.

12. A communications cable, comprising:
    a plurality of twisted pairs of individually insulated conductors extending in a longitudinal direction, wherein at least one of the plurality of twisted pairs is configured to transmit a power signal and has a first direct current resistance;
    a shield comprising longitudinally continuous electrically conductive material, the shield formed around at least a portion of the plurality of twisted pairs and the shield having a second direct current resistance that is approximately equal to the first direct current resistance; and
    a jacket formed around the plurality of twisted pairs and the shield.

13. The communications cable of claim 12, wherein the shield functions as a return conductor for the at least one twisted pair of the plurality of twisted pairs.

14. The communications cable of claim 12, wherein the at least one of the plurality of twisted pairs comprises at least two twisted pairs, and wherein the first direct current resistance comprises a combined resistance of the at least two twisted pairs.

15. The communications cable of claim 12, wherein the at least one of the plurality of twisted pairs comprises a single twisted pair, and
    wherein the shield comprises an individual shield formed around the single twisted pair.

16. The communications cable of claim 12, wherein the at least one of the plurality of twisted pairs configured to transmit a power signal comprises a first portion of the plurality of twisted pairs configured to transmit a first power signal and having the first direct current resistance, wherein the shield comprises a first shield formed around the first portion of the plurality of twisted pairs and having the second direct current resistance, and further comprising:
    a second portion of the plurality of twisted pairs configured to transmit a second power signal and having a third direct current resistance; and
    a second shield formed around the second portion of the plurality of twisted pairs and having a fourth direct current resistance approximately equal to the third direct current resistance.

17. The communications cable of claim 16, wherein the first portion of the plurality of twisted pairs comprises a first twisted pair, the first shield comprises an individual shield formed around the first twisted pair, the second portion of the plurality of twisted pairs comprises a second twisted pair, and the second shield comprises an individual shield formed around the second twisted pair.

18. The communications cable of claim 16, wherein each of the first shield and the second shield respectively comprise:
    a first layer comprising longitudinally continuous electrically conductive material; and
    a layer of dielectric material formed around the first layer.

19. The communications cable of claim 12, wherein the shield comprises a corrugated shield.

20. The communications cable of claim 12, wherein the longitudinally continuous electrically conductive material comprises a first layer of the shield, and
    wherein the shield comprises a second layer of material.

* * * * *